(12) United States Patent
Ogata et al.

(10) Patent No.: US 6,671,421 B1
(45) Date of Patent: Dec. 30, 2003

(54) METHOD OF ADJUSTING IMAGE READING POSITION, METHOD OF READING IMAGE AND IMAGE READING APPARATUS

(75) Inventors: Takefusa Ogata, Fukuoka (JP); Eiji Kitsutaka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/546,559

(22) Filed: Apr. 10, 2000

(30) Foreign Application Priority Data

| Apr. 13, 1999 | (JP) | 11-105176 |
| Jun. 21, 1999 | (JP) | 11-173594 |
| Jun. 21, 1999 | (JP) | 11-173598 |

(51) Int. Cl.[7] ................................................. G06K 9/36
(52) U.S. Cl. ...................................... 382/284; 345/629
(58) Field of Search ........................... 382/276, 282, 382/284, 286, 289, 296, 297, 298, 154; 358/451, 449, 450; 345/629, 641; 702/150, 151; 348/584, 601, 581, 218.1; 250/237, 208.1

(56) References Cited

U.S. PATENT DOCUMENTS

| 4,337,394 A | * | 6/1982 | Fukushima | 250/237 G |
| 5,424,773 A | * | 6/1995 | Saito | 348/218.1 |
| 5,608,543 A | * | 3/1997 | Tamagaki et al. | 358/450 |
| 5,990,470 A | * | 11/1999 | Classens | 250/208.1 |
| 6,106,094 A | * | 8/2000 | Otani et al. | 347/19 |

FOREIGN PATENT DOCUMENTS

| JP | 62101170 | 5/1987 |

* cited by examiner

*Primary Examiner*—Jayanti K. Patel
*Assistant Examiner*—Seyed Azarian
(74) *Attorney, Agent, or Firm*—Stevens, Davis, Miller & Mosher, LLP

(57) ABSTRACT

The invention provides an image reading apparatus structured such that two or more line image sensors are arranged in a main scanning direction, in which it is possible to securely restrict a position shift of an image reading area caused by a line image sensor, thereby performing an image reading operation at a high quality. In the image reading apparatus in which the line image sensors are arranged, a marker is formed as an image in an overlapping portion of the line image sensors, the marker is read by the line image sensors themselves so as to inspect a relative position between the line image sensors and the marker with reference to a magnitude of an output thereof corresponding to a judging standard, and the positions of the line image sensors are shifted on the basis of the result, thereby preventing a position shift in a sub scanning direction from being generated.

6 Claims, 17 Drawing Sheets

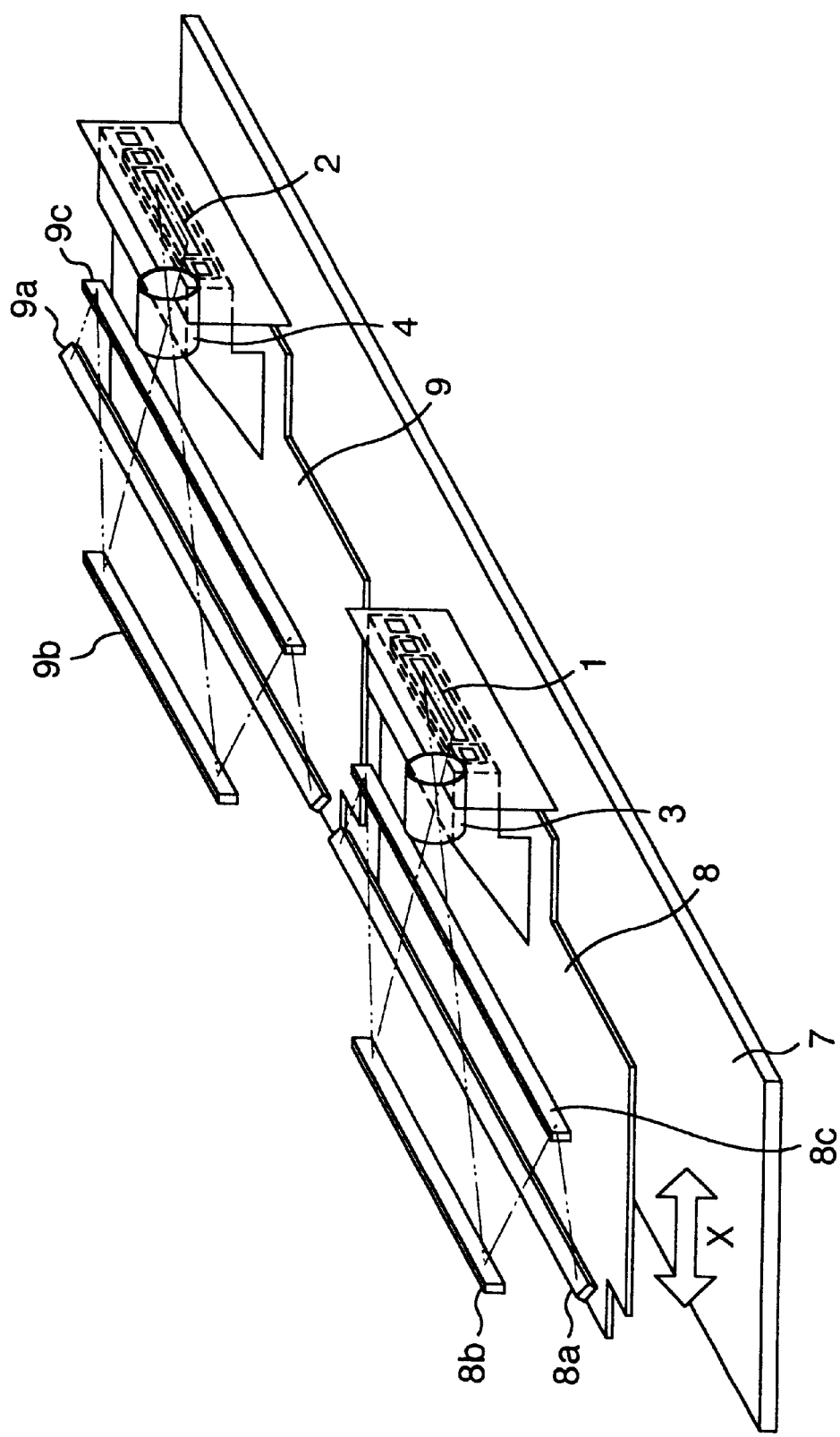

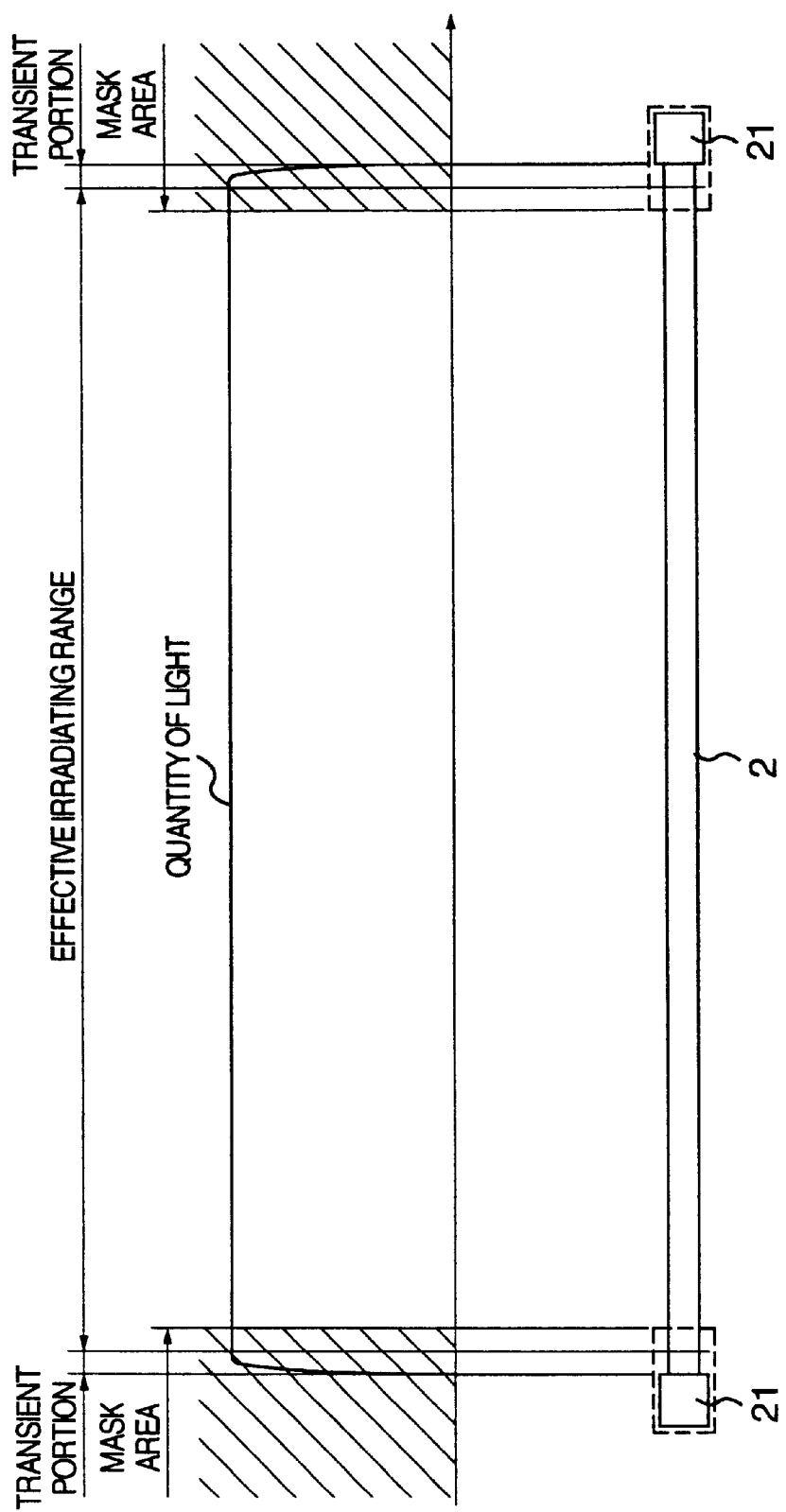

METHOD OF ADJUSTING IMAGE READING POSITION, METHOD OF READING IMAGE AND IMAGE READING APPARATUS

BACKGROUND OF THE INVENTION

1. Field of the Invention

The present invention relates to an image reading apparatus in which two or more line image sensors are arranged in a width direction of a paper for the purpose of corresponding to a large-size paper, and more particularly to a method of adjusting a reading position and a method of reading an image for the purpose of reading an image having a good quality.

The present invention relates to an image reading apparatus employed for reading a large-size paper, and more particularly to an image reading apparatus provided with a light source for reading an image having a good quality.

2. Description of the Related Art

For example, an image reading apparatus provided in a copy machine or the like is provided with line image sensors structured such that photo-electric conversion elements such as a charge couple device (hereinafter, refer to as a CCD) or the like are arranged in a line in a main scanning direction, and reads an image in accordance with a scanning operation.

In a conventional line image sensor, a sensor which can correspond to a paper having a A3 size has spread, however, it has been impossible to manufacture a line image sensor having a size more than the above.

For example, a paper having an A0 size has a width of about 840 mm, in the case of reading a pixel in 400 dpi, 13230 pixels are required. On the contrary, the line image sensor is currently structured to only have about 7500 pixels, and accordingly, in order to correspond to the paper of A0 size, two line image sensors are required.

In view of the background mentioned above, in an apparatus of the type treating the large paper such as the A0 size or the like, there has been employed a method of reading an image by arranging two line image sensors in a line in a main scanning direction (a direction vertically crossing a paper supply direction and coinciding with a width direction of a paper) and combining the scanning operations of these line image sensors. This type of image reading is described, for example, in Japanese Patent Unexamined Publication No. 62-101170.

In a structure in which a plurality of line image sensors are arranged in addition to the structure described in this publication, it is necessary to partly overlap a reading area for adjacent line image sensors so as to prevent a joint portion from being generated in the image by a boundary portion between the adjacent image sensors. In accordance with the arrangement of the line image sensors, the image can be read from the large size paper.

The line image sensor is severely controlled in a manufacturing step, and is assembled in an apparatus main body so that a position shift or the like is not generated and shipped.

However, since the portion at which the line image sensors are overlapped becomes the joint portion of two image reading area, there is a possibility that the line image sensors are shifted from a normal position when a vibration or the like is applied to the line image sensors at a time of shipping or mounting. The position shift is generated in both of the main scanning direction and a sub scanning direction (a paper supply direction). Then, the position shift in the main scanning direction forms an image shift in a width direction of the paper, and the position shift in the sub scanning direction forms an image shift in the paper supply direction.

In order to prevent the image from shifting, it is necessary to detect and correct the position shift of the line image sensor. As the correcting method, for example, there is a method of cutting a chart corresponding to a marker receiving a light beam from an optical system provided in an image reading apparatus itself on a back surface of a platen for supporting the papers and detecting a position shift of the line image sensor with reference to the chart.

However, since the platen itself is fixed to the apparatus, it is very hard to accurately position the marker to a normal position due to an assembling error to the apparatus or the like even when the marker is provided on the back surface thereof. Accordingly, even when it is possible to detect the position shift of the line image sensor, it is hard to obtain an optimum value for quantitaively correcting, so that it is impossible to effectively restrict the image shift.

FIG. 17 is a schematic view of a reading optical system of a conventional image reading apparatus as seen in a main scanning direction.

In FIG. 17, an image forming apparatus is provided with a paper supply passage for a paper (not shown) in a direction of an arrow in FIG. 17 as setting a surface having an image to be read of the paper to be faced downward, and an image reading portion for scanning and reading the image on the paper passing over a target glass 11 provided in the paper supply passage. The image reading portion is provided with an optical system which irradiates a light beam onto the image surface of the paper over the target glass 11 from a light source 12, forms a reflected light beam by a lens 13 and enters into a line image sensor 14.

Here, a structure employed as the light source 12 includes a cold cathode tube or the like. A cold cathode tube having a longitudinal length substantially corresponding to a degree between an A4 size and an A3 size is developed. Further, since the cold cathode tube is strong against a low temperature and has a quantity of light between forty thousands and a hundred thousands which is more than that of LED and a fluorescent lamp, the cold cathode tube is suitable for a light source of a normal size image reading apparatus, for example, for the A3 size or the like.

However, in the case that it is desired to realize the image reading apparatus for treating the large size paper such as an A0 size or the like, since the cold cathode tube has only a length capable of corresponding to the A3 size, it is impossible to use the cold cathode tube as it is for the light source.

At this time, even when arranging the cold cathode tubes in a line in a main scanning direction and providing and using in a connecting state, a socket portion exists at both ends of the cold cathode tube and an effective irradiation range exists in the light source. Accordingly, a quantity of light in the connecting portion of the adjacent cold cathode tubes becomes insufficient.

SUMMARY OF THE INVENTION

Accordingly, an object of the present invention is to provide an image reading apparatus structured such that two or more line image sensors are arranged in a main scanning direction, in which it is possible to securely restrict a position shift of an image reading area caused by a line image sensor, thereby performing an image reading operation at a high quality.

Further, an object of the present invention is to provide an image reading apparatus which can irradiate a sufficient amount of light beam to a large-size paper and can perform a good image reading operation.

In accordance with the present invention, there is provided a method of adjusting an image reading position structured such that a plurality of line image sensors having CCDs arranged as a photo-electric conversion element are arranged in a main scanning direction of a paper, and end portions in respective reading areas of the line image sensors adjacent to each other in an arrangement direction are overlapped with each other, thereby adjusting an image reading position of the line image sensor at a time of reading a whole image on the paper by a combination of the line image sensors, comprising the steps of:

forming an image on an area included in the overlapping portion between a pair of adjacent line image sensors so as to form a marker;

respectively reading the marker by the pair of line image sensors;

inspecting a relative position of each of the pair of line image sensors with respect to the marker on the basis of each of output values of the pair of line image sensors at a time of reading the marker; and coinciding each of the overlapping portions of the pair of line image sensors with a sub scanning direction on the basis of the inspected result of the relative position.

In accordance with the present invention, there is provided a method of reading an image structured such that a plurality of line image sensors having CCDs arranged as a photo-electric conversion element are arranged in a main scanning direction of a paper, and end portions in respective reading areas of the line image sensors adjacent to each other in an arrangement direction are overlapped with each other, thereby reading a whole image on the paper by a combination of the line image sensors, comprising a step of:

gradually changing the image in the overlapping portion between the line image sensors adjacent in the main scanning direction from an image data main body of the image read by one of the line image sensors to an image data main body of the image read by another of the line image sensors, toward the main scanning direction.

In accordance with the present invention, there is provided an image reading apparatus structured such that a plurality of line image sensors having CCDs arranged as a photo-electric conversion element are arranged in a main scanning direction of a paper, and reading areas of the line image sensors adjacent to each other in an arrangement direction are overlapped with each other, comprising:

moving means for independently moving each of the line image sensors in a sub scanning direction vertically crossing the main scanning direction;

image forming means for forming an image on an area included in the overlapping portion between the line image sensors so as to form a marker;

inspecting means for inspecting a relative position of each of the pair of line image sensors with respect to the marker on the basis of each of output values of the pair of line image sensors at a time when the line image sensors read the marker; and driving means for driving in a direction of coinciding each of the overlapping portions of the pair of line image sensors with a sub scanning direction on the basis of the inspected result of the relative position.

Further, in accordance with the present invention, there is provided an image reading apparatus characterized in that the image corresponding to the marker changes a width in the main scanning direction.

In order to achieve the object, in accordance with the present invention, there is provided an image forming apparatus structured such that light sources of the image forming apparatus are arranged in a zigzag manner so that end portions of the light sources overlap with each other with respect to a scanning axis, and a light beam is irradiated onto an image surface of the paper from the light sources arranged in a zigzag manner.

Accordingly, it is possible to irradiate the light beam in a zigzag manner from both sides of the scanning axis, obtain a sufficient quantity of light with respect to a large-size paper and read a good image.

BRIEF DESCRIPTION OF THE DRAWINGS

FIG. 6 is a schematically perspective view which shows an image reading portion in the scanner apparatus in accordance with the present invention except a part thereof;

FIG. 16 is a schematic view which shows a distribution of light strength of a cold cathode tube.

DESCRIPTION OF THE PREFERRED EMBODIMENTS

First Embodiment

Figure 1:
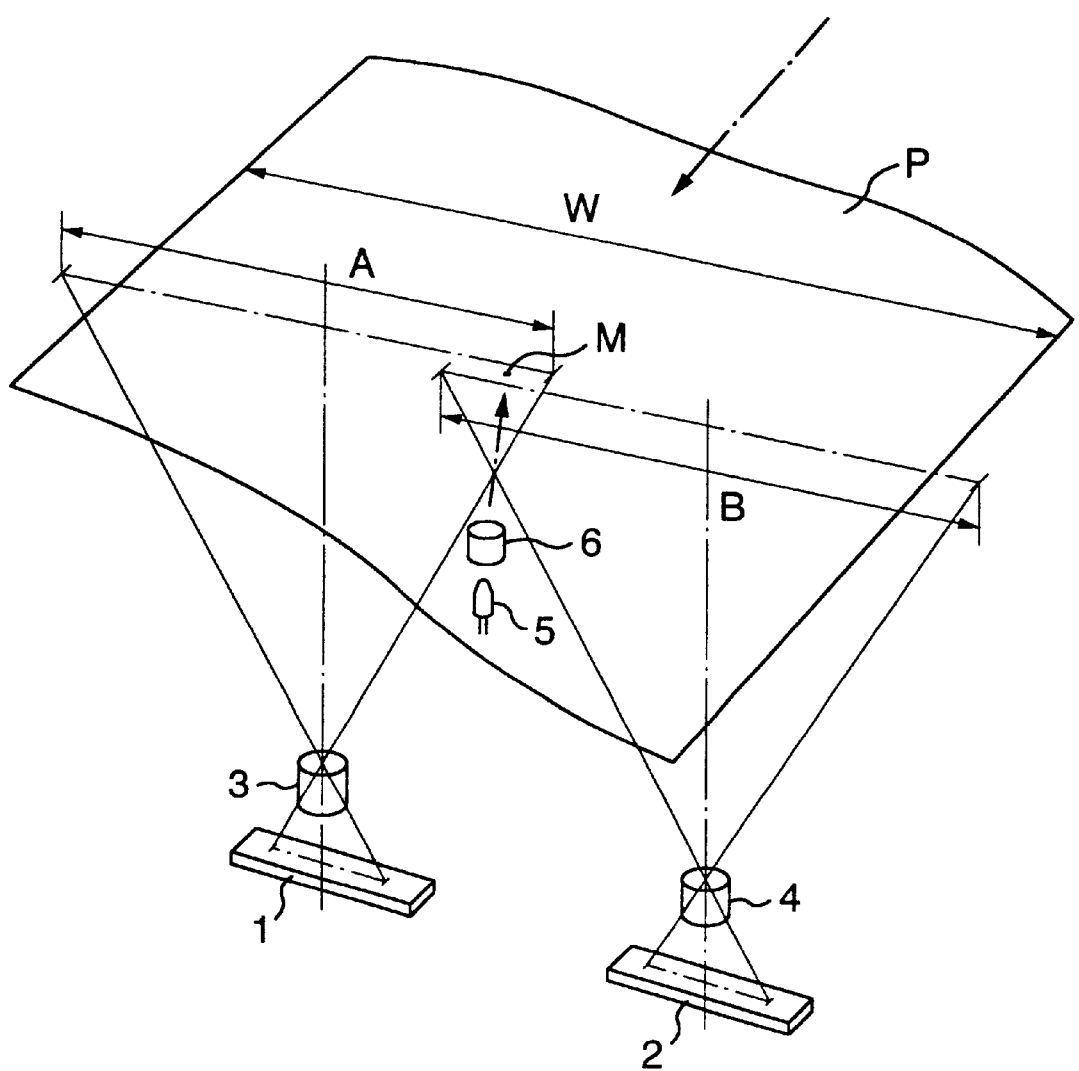
FIG. 1 is a schematically perspective view of a reading optical system in a scanner apparatus in accordance with the present invention.
Figure 2:
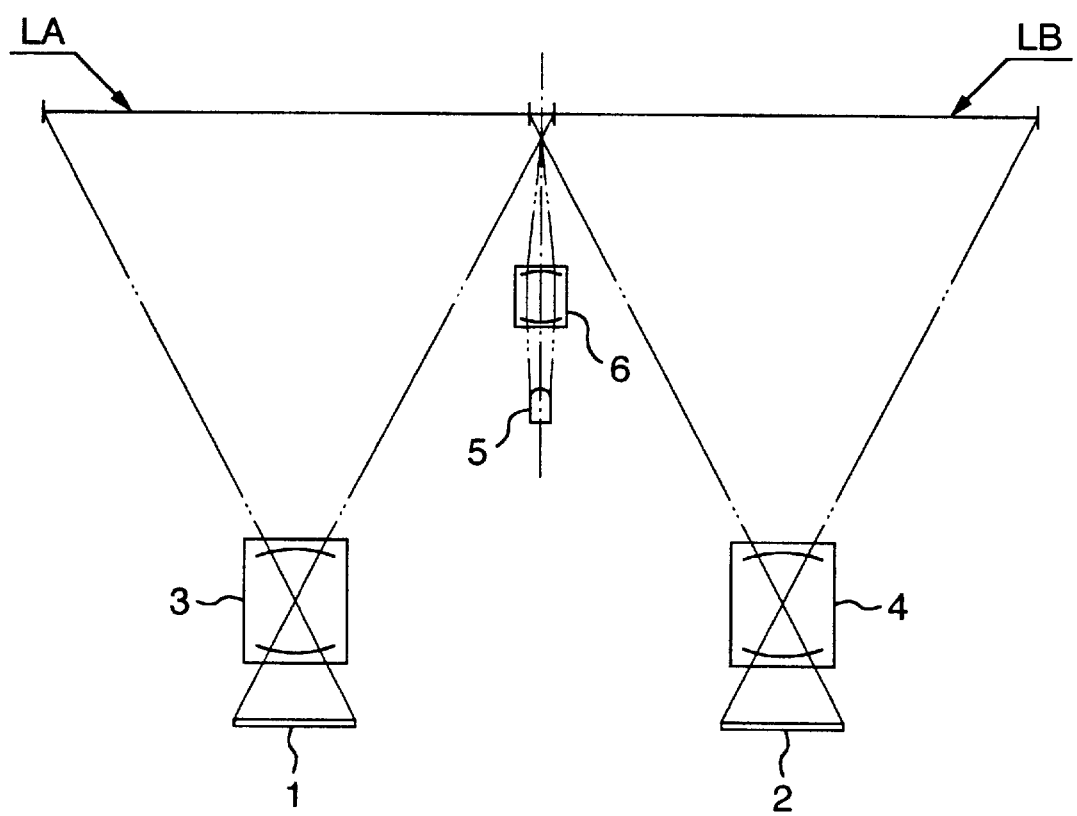
FIG. 2 is a schematic view of the reading optical system shown in FIG. 1 as seen from a paper supply direction.

FIGS. 1 to 5 are conceptional views for explaining a position correction in a sub scanning direction (coinciding with a paper supply direction) of a line image sensor in accordance with the present invention, in which FIG. 1 is a schematically perspective view of a reading optical system and FIG. 2 is a schematic view of the reading optical system as seen in the paper supply direction.

In FIGS. 1 and 2, in an image reading apparatus, there are provided a paper supply passage which feeds a paper P in a direction of an arrow shown by a single dot chain line in these drawings in a state of directing an image surface to be read to a downward direction, and an image reading portion which scans and reads the image on the paper P passing over a transparent glass platen provided in the paper supply passage. The image reading portion is constituted by an optical system including a plurality of mirrors (not shown), irradiates a light beam onto the image surface of the paper P on the platen from a light source (not shown), and is provided with an optical system for entering the irradiated image into an image detecting portion along an optical path through the mirror. Further, the optical system is provided with line image sensors 1 and 2, and lenses 3 and 4 for forming the light from the optical path through the mirror on the line image sensors 1 and 2.

The line image sensors 1 and 2 are well known as a CCD image sensor, and are arranged substantially in series in the main scanning direction in the same manner as that described in the publication mentioned in the conventional embodiments. A reading area of the line image sensors 1 and 2 corresponds to areas A and B shown in FIG. 1, and a part of the areas A and B overlaps in a center portion in the main scanning direction. A scanning length in the main scanning direction of a combination of a whole of the areas A and B is set to be longer than a width of the paper P, that is, a length W of a line vertically crossing the paper supply direction. Accordingly, an image of the paper is input as a reading data separated by the line image sensors 1 and 2, and the same image is simultaneously read by the line image sensors 1 and 2 in a portion where the areas A and B of the line image sensors 1 and 2 overlap.

In this case, as already mentioned in the item of the prior art, since a width of an A0 size paper is about 840 mm, the number of pixels of 13230 is at present required in the main scanning direction when being read by a standard 400 dpi (dot per inch). Further, in the line image sensor utilizing the CCD, an upper limit of the number of pixels capable of being treated is about 7500 at present, and accordingly, an arrangement pitch of the image reading sensors respectively arranged in the line image sensors 1 and 2 is set to be about 64 μm.

The line image sensors 1 and 2 utilizing the CCD does not generate an image shift in a boundary portion between the areas A and B whenever the sensors arranged at a pitch of 64 μm satisfy a relation of being completely aligned in both of the main scanning direction and the sub scanning direction even at the overlapping portion between the areas A and B.

However, even when the line image sensors 1 and 2 are assembled within the scanner apparatus without an assembling error, it is impossible to keep an optimum alignment of the line image sensors 1 and 2 due to a vibration at a time of shipping and mounting, a fine thermal deformation of a holding member caused by a temperature change or the like.

For example, FIG. 1 illustrates a state that the positions of the line image sensors 1 and 2 are shifted in the sub scanning direction in an exaggerating manner, and the position of the line image sensor 2 is shifted to a downward side in the paper supply direction in comparison with the line image sensor 1. When the position is shifted in this manner, a reading position with respect to the image on the paper P is also shifted in the overlapping portion of the areas A and B.

Accordingly, the data of the image read in the overlapping portion is input to an image processing portion (not shown) as a read image shifted in a sub scanning direction not as an image area continuously formed in a width direction of the paper P, and is apparent as a shift of the image when being reproduced.

With respect to the position shift in the sub scanning direction of the line image sensors 1 and 2, in accordance with the present invention, the position shift is mechanically corrected and an alignment correction is performed with respect to the line image sensors 1 and 2. Further, for the correcting operation, as shown in FIG. 2, an LED (luminescent diode) 5 and a lens 6 corresponding to a light source for applying a marking for a standard of position correcting are provided immediately below the overlapping portion between the areas A and B as image forming means in accordance with the present embodiment.

The LED 5 and the lens 6 are arranged so that an optical axis thereof vertically crosses a feed surface of the paper P at a high accuracy, so as to irradiate a light beam to the overlapping portion between the areas A and B where both of the line image sensors 1 and 2 simultaneously read. Then, for example, when setting a peripheral surface of the roller which is arranged on a platen and guides the paper P to be white and obtaining a light irradiated image on the peripheral surface of the roller, it is possible to set the image as a marker M.

In accordance with the manner mentioned above, when the LED 5 is irradiated, the marker M can be obtained as the image in the overlapping portion between the areas A and B as shown in FIG. 1. Since the marker M is an image constituted by a point contained in the overlapping portion between the areas A and B, it can be read by the line image sensors 1 and 2 in the same manner as the case of reading the image of the paper P.

Figure 3:
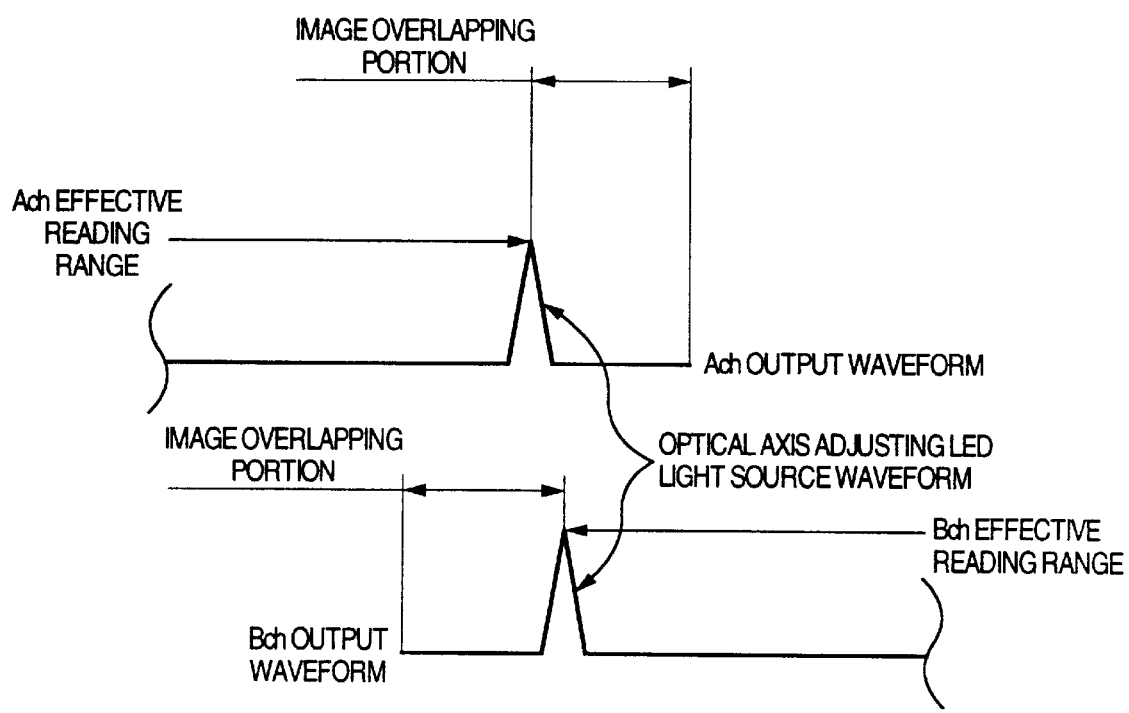
FIG. 3 is a schematic view which shows a positional relation between an output waveform when an image irradiated from an LED is read by first and second line image sensors, and an overlap in reading areas.

FIG. 3 is a schematic view which shows a positional relation between an output waveform when the line image sensors 1 and 2 read the image irradiated from the LED 5, and an overlap in the areas A and B.

In FIG. 3, when the LED 5 emits light so as to form the marker M as the image, both of the line image sensors 1 and 2 output an LED light source waveform for adjusting an optical axis as a peak value as far as the line image sensors 1 and 2 are kept at the normal position with respect to the marker M without being shifted.

On the contrary, when the line image sensors 1 and 2 are shifted with respect to the position of the marker M as shown in FIG. 1, the output waveform is damped more as the shift amount is increased. Accordingly, by referring to the waveform output from the line image sensors 1 and 2, the position shift of the line image sensors 1 and 2 with respect to the marker M can be inspected. That is, a relative position of the line image sensors 1 and 2 themselves with respect to the marker M can be judged by utilizing the marker M read as the image. Further, when the output waveform of the peak value can be obtained from both of the line image sensors 1 and 2, the line image sensors 1 and 2 are arranged on a straight line passing through the marker M, and the position shift can be cancelled.

Figure 4:
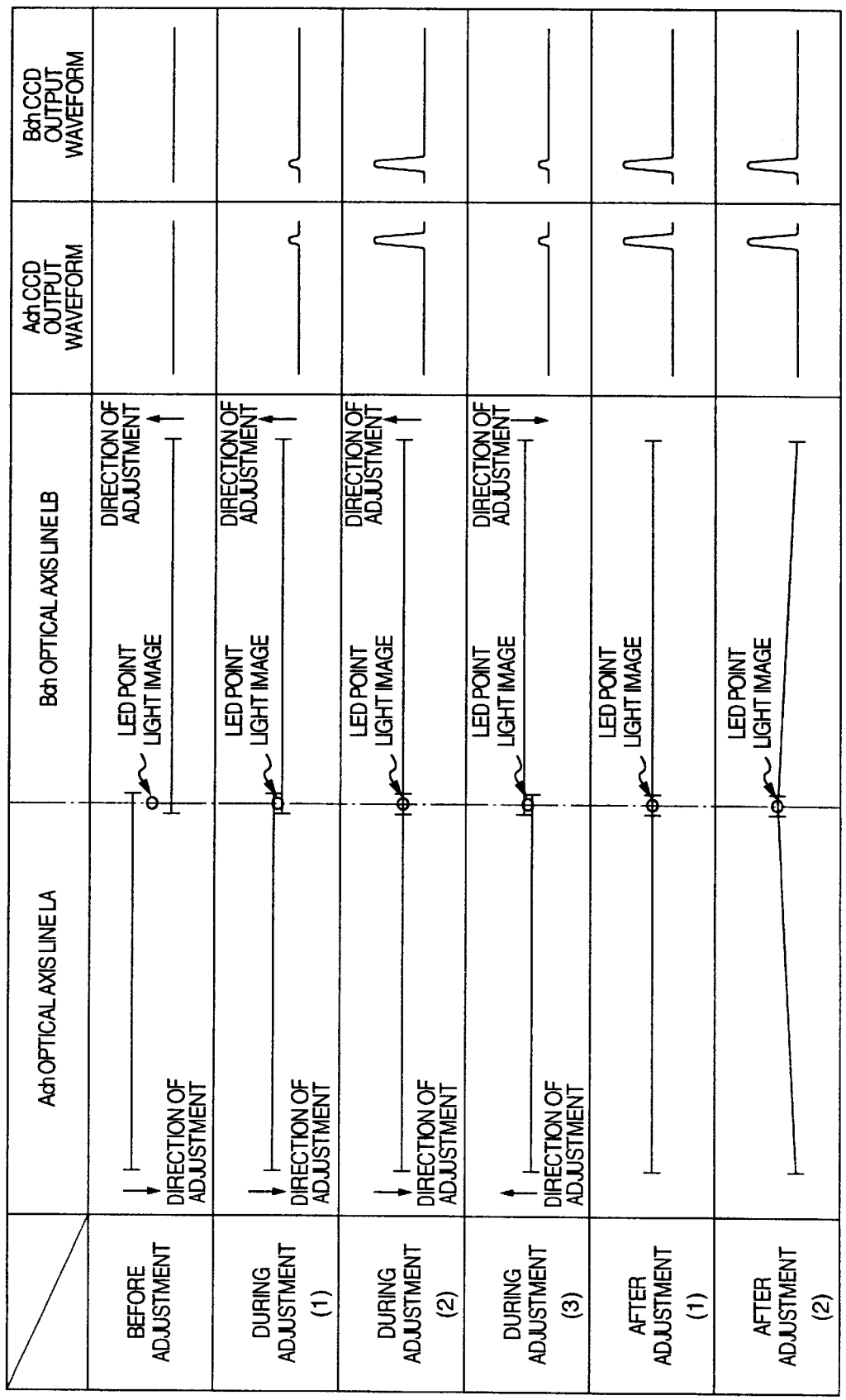
FIG. 4 is a view which shows a positioning way of the first and second line image sensors by means of an image irradiated from the LED as a table.

FIG. 4 shows a positioning way of the line image sensors 1 and 2 by means of the image irradiated from the LED 5 as a table. In this FIG. 4, a description will be given with supposing that the positions of the line image sensors 1 and 2 are respectively shifted in an upstream side and a downstream side of the marker M.

In FIG. 4, sections indicated by Ach optical axis line LA and Bch optical axis line LB respectively show positions of scanning lines of the line image sensors 1 and 2, and a point indicated by a circle in a boundary between the sections shows a point light image formed by the LED 5, that is, the marker M. Further, sections indicated by Ach CCD output waveform and Bch CCD output waveform respectively show output waveforms by the line image sensors 1 and 2 at a time of correcting the position shift.

The correcting operation of the position shift is performed by steps starting from a step prior to adjustment shown in the uppermost section to steps after adjustment (1) and (2) shown in two section upper from the bottom or the lowermost section through steps during adjustment (1), (2) and (3) shown in three section from the step prior to adjustment. Then, it is preferable to turn on the LED 5 and not to supply the paper P during the period of this correcting operation.

Before adjustment, in both of the line image sensors 1 and 2, the LED point light image, that is, the amount of position shift from the marker M formed by a light emission of the LED 5 is large, and is out of the scanning range of the line image sensors 1 and 2. Accordingly, there is no output from the line image sensors 1 and 2. When moving each of the line image sensors 1 and 2 in a direction toward the side of the marker M ("an adjusting direction" shown in FIG. 4), the image of the marker M is gradually detected, and the output value outputs a small waveform (the step during adjustment (1)). When further moving the line image sensors 1 and 2, the output value outputs a great waveform (the step during adjustment (2)), and thereafter, the output value is again damped (the step during adjustment (3)).

In accordance with the steps mentioned above, it is known that a point having the maximum output value is contained in the strokes of the line image sensors 1 and 2 moved in the same direction during the period between the step during adjustment (1) and the step during adjustment (3). Further, after the step during adjustment (3), the line image sensors 1 and 2 are respectively moved in opposite directions and the positions having the maximum output value are selected. By repeating the operations at some times, an adjustment is performed so that the output values from the line image sensors 1 and 2 become maximum and are equal to each other. Under the condition, the line image sensors 1 and 2 take the positional relation such that the scanning lines coincide on the straight line passing through the marker M, as shown in the step after adjustment (1).

As mentioned above, the position shift of the line image sensors 1 and 2 in the sub scanning direction is canceled on the basis of the marker M utilizing the light emission from the LED 5, thereby preventing the shift of the read image at the overlap portion from being generated.

In this case, in the step after adjustment (2), the scanning lines of the line image sensors 1 and 2 do not vertically cross the sub scanning direction and are inclined thereto. In this case, an angle of incline of the scanning lines is fine, and is exaggeratingly illustrated. If the structure is made such that the position of the overlap portion of the line image sensors 1 and 2 is not at least shifted even when the scanning lines are inclined at a fine angle as mentioned above, it is possible to prevent the shift of the image reading from being generated. That is, as previously described, since 7500 sensors are arranged in the line image sensors 1 and 2 at a fine pitch of about 64 $\mu$m, the image does not form a large distorted image with human eyes even when reading the straight line image in the main scanning direction. Accordingly, it is sufficient that the positions of the line image sensors 1 and 2 are not shifted at least in the overlap portion, and it is not essential that the line image sensors 1 and 2 should be arranged on the line including the marker M so as to form a straight line.

As mentioned above, in accordance with the present invention, it is possible to adjust the positions of the line image sensors 1 and 2 on the basis of the marker M obtained by the light emission from the LED 5. Accordingly, it is not necessary to adjust the position while once supplying, for example, the chart exclusive for the position adjustment so as to read the image before starting the image reading operation, and no load is applied to the user.

The above operation means that the overlap portion of the line image sensors 1 and 2 mechanically correct the position shift in the sub scanning direction so as to cancel the shift of the read position of the image on the paper P. On the contrary, the line image sensors 1 and 2 are structured such that the same portion of the image on the paper P is read by the image overlapping portion thereof as shown in FIG. 3. In this case, for example, it is controlled such that the line image sensor 1 operates toward the terminal end of the effective reading range thereof and the line image sensor 2 operates from the start end of the effective reading range thereof, whereby it is possible to continuously read the image in the main scanning direction of the paper P. That is, by starting the reading by means of the line image sensor 2 at the same time when the reading from the line image sensor 1 is completed, the image reading in the main scanning direction is executed.

However, when starting the reading of the line image sensor 2 after the reading from the line image sensor 1 is completed, there is a possibility that a shift of the reading range corresponding to at least one pixel or more is generated in some positional relation of the CCD sensors respectively arranged therein. This fact will be described below with reference to FIG. 5.

In FIG. 5, the overlapping portions of the reading areas A and B of the line image sensors 1 and 2 are expressed by the pixel reading dots corresponding to the arrangement of the sensors in the line image sensors 1 and 2. In this case, in order to simplify the description, it is supposed that the same number (n) of pixels are included in each of the overlapping portions of the areas A and B.

Figure 5A:
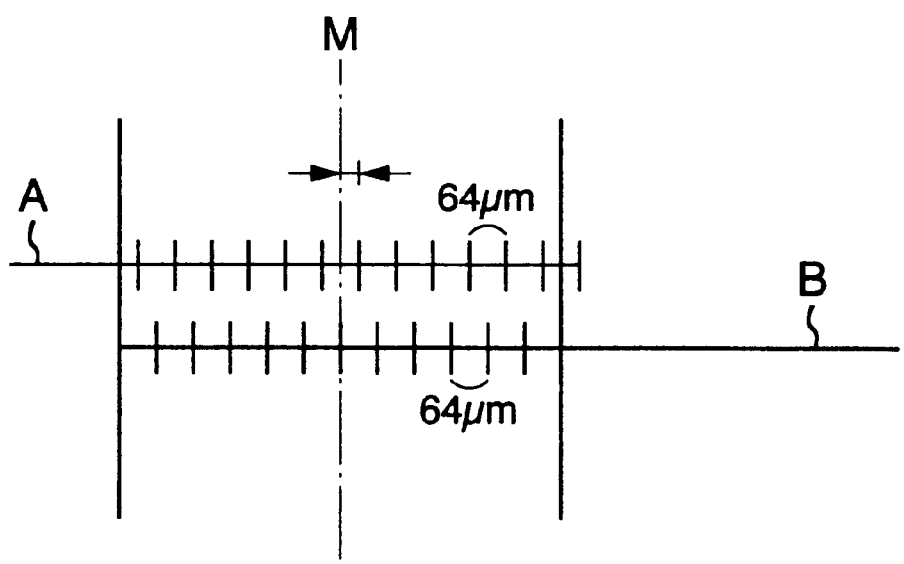
FIG. 5 is a view of the overlap portion in the reading areas of the first and second line image sensors on which pixels corresponding to an arrangement of the first and second image sensors are expressed by dots.

FIG. 5A shows a position shift in the main scanning direction of each of the sensor arrangements in the line image sensors 1 and 2. The pitch of the image reading dot of the line image sensor is kept to 64 $\mu$m described above, however, the line image sensor 1 treating the area A is slightly shifted rightward, and the line image sensor 2 treating the area B is positioned at the normal position. Accordingly, the shift in the main scanning direction exists between the sensors in the line image sensors 1 and 2, and the image reading position for the image on the paper is shifted when changing the image reading from the line image sensor 1 to the line image sensor 2.

Figure 5B:
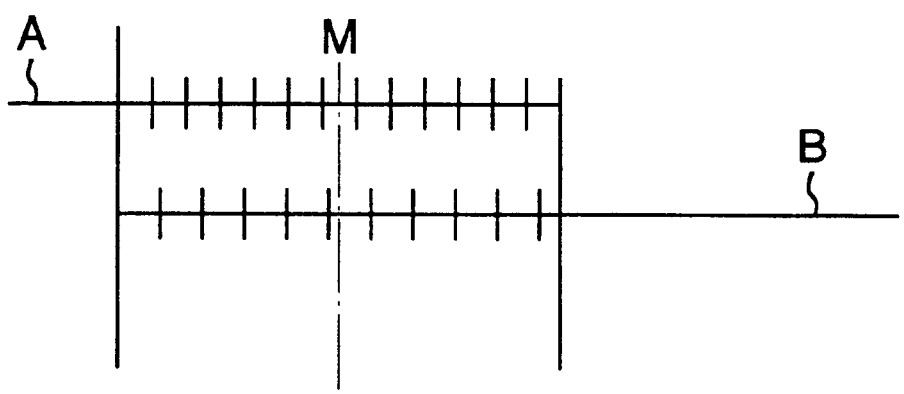

FIG. 5B shows a position shift of the image reading dot due to a difference of reading magnification between the line image sensors 1 and 2. The line image sensor 1 is set in the normal magnification, however, the line image sensor 2 is set such that an interval between the reading dots is large, that is, a magnification is large. Also in this case, the positions of the image reading dots in the main scanning direction are shifted to each other, and the image reading positions for the image on the paper are also shifted.

Then, in accordance with the present invention, in the overlapping portion of the areas A and B, the image reading is gradually shifted from the image reading operation mainly performed by the line image sensor 1 to the image reading operation mainly performed by the line image sensor 2, thereby solving the shift of the image in the overlapping portion and an unclearness due to lack of pixel.

In FIG. 5, each of n pixels is read by the sensor arrangement of the line image sensors 1 and 2 corresponding thereto and is input to the image processing portion as an image data D. Each of the image data D with respect to each of pixels 1 to n is weighted in accordance with a weighted average, and the image data is changed from the image data mainly obtained by the line image sensor 1 to the image data mainly obtained by the line image sensor 2 while taking the data in from both of the line image sensors 1 and 2. That is, when setting the image data read by the line image sensors 1 and 2 to DA and DB and the weight of the weighted average to WA and WB, with respect to each of the pixels 1 to n, the image data D of each of the images can be calculated in accordance with the following formula (1).

$$D = (WA \cdot DA + WB \cdot DB)/(WA + WB) \quad (1)$$

Then, the following condition (2) is added.

$$WA + WB = 1 \quad (0 \leq WA \leq 1, \; 0 \leq WB \leq 1) \quad (2)$$

On the basis of the condition formula mentioned above, in the middle of moving from the area A to the area B, with respect to the first pixel, the image data DA read by the line image sensor 1 is input to the image processing portion as it is. From the second pixel, the image data DB by the line image sensor 2 is added to the image data DA by the line image sensor 1, and a weight of the image data DB by the line image sensor 2 is gradually increased. Then, with respect to the nth pixel, the line image sensor 1 does not read it, and the image data DB read by the line image sensor 2 is input to the image processing portion as it is.

As mentioned above, in the overlapping portion of the areas A and B, the image on the paper P is read while gradually changing the image reading operation from the image reading by the line image sensor 1 to the image reading by the line image sensor 2 step by step. Accordingly, since the image is input on the basis of both of the line image sensors 1 and 2 in the overlapping portion even when the positions of the line image sensors 1 and 2 are shifted in the main scanning direction in the overlapping portion, it is possible to prevent the image from becoming unclear due to lack of the number of pixel.

As mentioned above, a description was given of an idea of adjustment for the position shift of the line image sensors 1 and 2 in accordance with the present invention and a fact that a good image reading can be performed by treating the image data in the overlapping portion of the reading areas A and B. Next, a description will be in detail given of a structure for correcting the position shift of the line image sensors 1 and 2 with reference to FIGS. 6 to 10.

FIG. 6 is a schematically perspective view which shows the image reading portion in the image reading apparatus in accordance with the present invention except a part thereof.

In FIG. 6, the image reading portion is provided with a base frame 7 fixed immediately below the feeding passage of the paper P shown in FIG. 1 and two optical bases 8 and 9 mounted on the base frame 7 so as to freely move in a direction of an arrow X. These optical bases 8 and 9 are structured as moving means in the present embodiment, and the line image sensors 1 and 2 and the lenses 3 and 4 are respectively arranged therein. Then, the optical bases 8 and 9 are provided with mirrors 8*a*, 8*b*, 8*c*, 9*a*, 9*b* and 9*c* for forming an optical path of a compressed optical system until the line image sensors 1 and 2.

Figure 7:
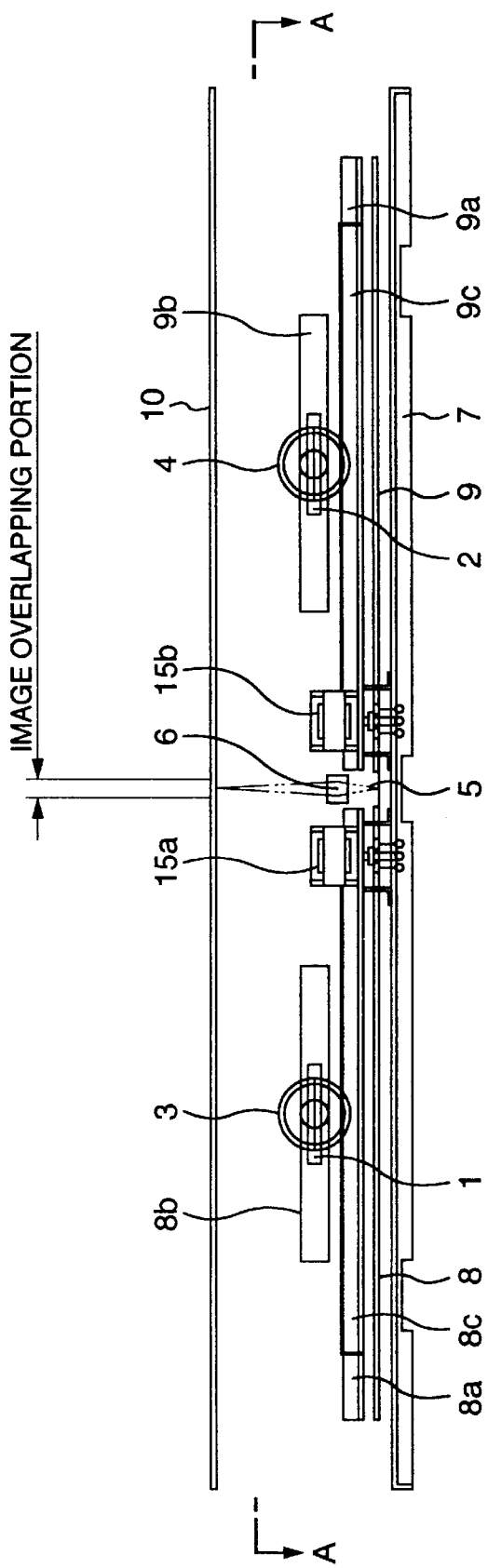
FIG. 7 is a front elevational view of an image reading portion as seen in a paper supply direction.
Figure 8:
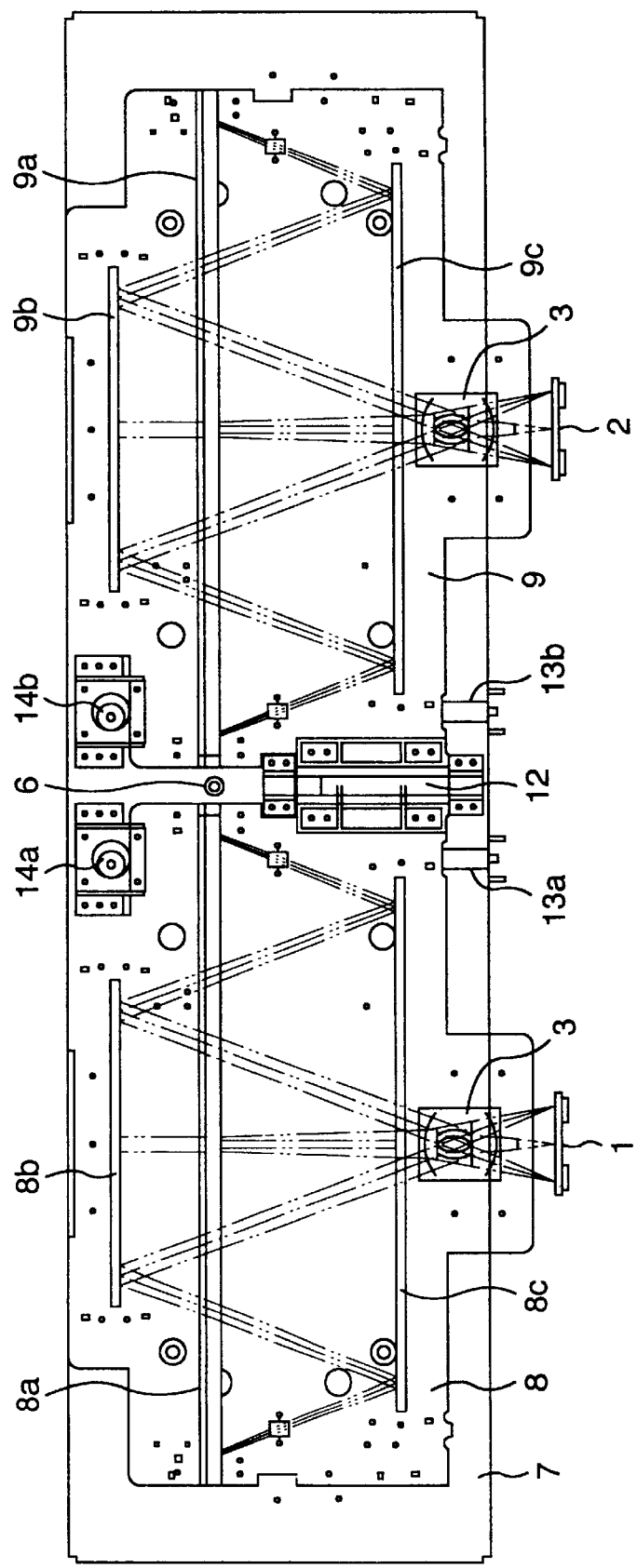
FIG. 8 is a plan view as seen in a direction of an arrow along a line A—A in FIG. 7.
Figure 9:
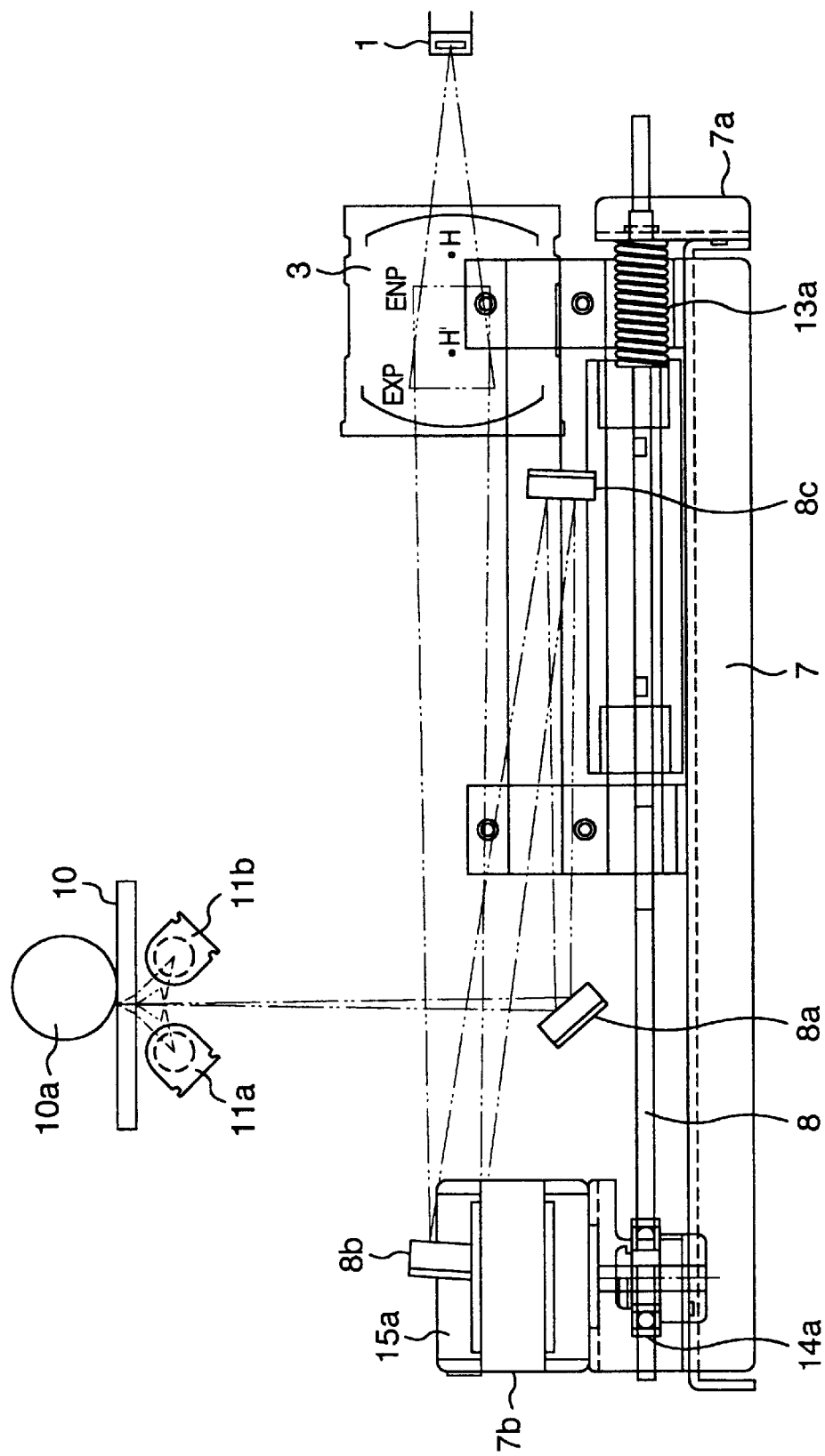
FIG. 9 is a left side elevational view as seen in parallel to a paper supply direction.

FIG. 7 is a front elevational view of the image reading portion as seen in a paper supply direction, FIG. 8 is a plan view as seen in a direction of an arrow along a line A—A in FIG. 7, and FIG. 9 is a left side elevational view as seen in parallel to the paper supply direction.

In FIG. 7, a transparent paper surface target glass 10 is arranged above the base frame 7, and it is set such that the image reading areas A and B by the line image sensors 1 and 2 are overlapped with each other with respect to the paper surface target glass 10, as shown in FIG. 1. Then, the LED 5 and the lens 6 are fixed and arranged to the side of the base frame 7 below the overlapping portion.

In FIG. 9, light source lamps 11*a* and 11*b* for reading the image are provided above the mirror 8*a* of the optical base 8 provided with the line image sensor 1 and near a lower surface of the paper surface target glass 10. Then, when irradiating the light from the light source lamps 11*a* and 11*b* onto the paper supplied to the upper surface of the paper surface target glass 10, the image is read by the line image sensor 1 through the optical path constituted by the mirrors 8*a*, 8*b* and 8*c*. Further, a roller 10*a* for guiding the paper in the paper supply direction is provided on the paper surface target glass 10 as an idler. The roller 10*a* is structured as described above such that the peripheral surface thereof is white, and a spot-like point image is formed on a peripheral surface thereof when the light beam is irradiated from the LED 5, whereby the point image is set to the marker M.

Further, in the side of the optical base 9 provided with the line image sensor 2, an optical system for reading the image utilizing the light source lamp is provided in the same manner.

Further, the optical base 8 is continuously connected to a shaft unit 12 provided in a center of the base frame 7 with being held at a right end portion side so as to freely move in a lateral direction in FIG. 9. The continuously connecting structure can be, for example, formed by providing a guiding shaft in the shaft unit 12 and providing a cylindrical slide metal fitting which is outward fitted to the shaft so as to slide in the optical base 8. Then, a compression coil spring 13*a* is interposed between a bracket 7*a* of the base frame 7 and a front end side of the optical base 8 and an eccentric cam 14*a* is stroke against an edge in a rear end side. The eccentric cam 14*a* is fixed on a mount 7*b* provided in the base frame 7 and mounted to an output shaft of a drive motor 15*a*. On the contrary, with respect to the optical base 9, a coil spring 13*b*, an eccentric cam 14*b* and a drive motor 15*b* are attached thereto in the same manner as shown in FIGS. 7 and 8.

In this case, in accordance with the present embodiment, each of respective combinations of the coil springs 13*a* and 13*b*, the eccentric cams 14*a* and 14*b* and the drive motors 15*a* and 15*b* corresponds to drive means.

As mentioned above, by holding each of the optical bases 8 and 9 in a longitudinal direction by the coil springs 13*a* and 13*b* and the eccentric cams 14*a* and 14*b*, it is possible to independently move the optical bases 8 and 9 on the basis of an amount of eccentricity due to an angle of rotation of the eccentric cams 14*a* and 14*b* in a vertical direction in FIG. 8. Then, since the moving direction coincides with the adjusting direction shown in FIG. 4, it is possible to position on the basis of the marker M formed by the light emission of the LED 5 in accordance with the operation of the drive motors 15*a* and 15*b*.

In this case, the adjustment of the position shift of the line image sensors 1 and 2 was already described with reference to FIG. 4, however, this adjustment can be automatically performed at a time of starting, for example, the scanner apparatus.

Figure 10:
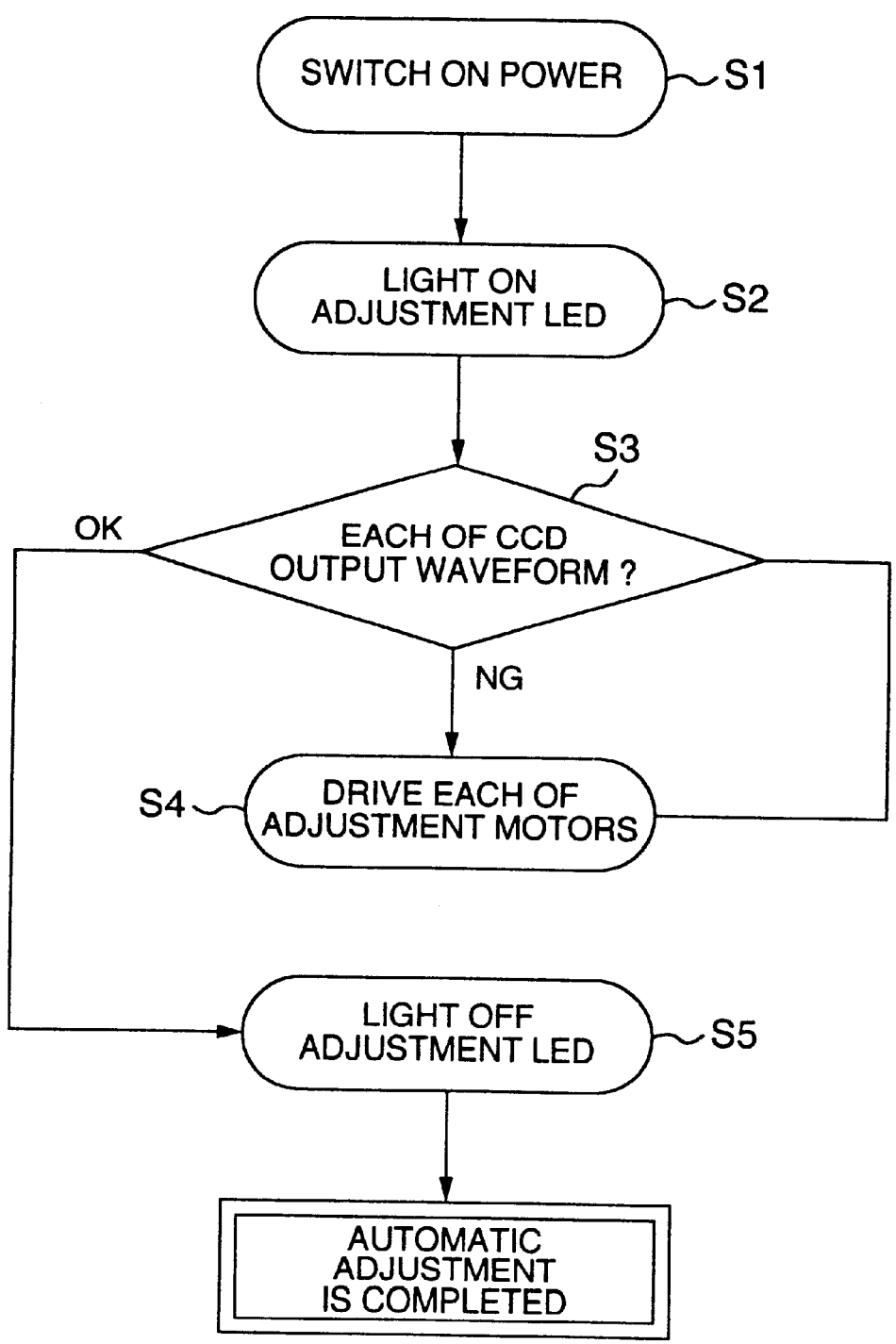
FIG. 10 is a flow chart for executing an automatic adjustment of a position shift at a time of starting the scanner apparatus.

FIG. 10 is a flow chart for executing the automatic adjustment of the position shift at the starting time, and when turning on a power switch of the scanner apparatus (S1), at first the LED 5 is lighted on so as to form the marker M on the peripheral surface of the roller 10a in the overlapping portion of the image reading areas A and B of the line image sensors 1 and 2, as shown in FIG. 1 (S2). Then, the line image sensors 1 and 2 read the marker M as the image, and control the operation of the drive motors 15a and 15b with reference to the output waveform, and then the automatic adjustment is finished when the output waveform becomes the output waveform corresponding to the steps after the adjustment (1) and (2) in FIG. 4 (S3 to S5).

In this case, in addition to the automatic adjustment at the starting time, it is possible to automatically adjust in correspondence to the magnitude of the temperature change for the case of being used under an environment having a severe temperature change. For example, the structure can be made such that a temperature sensor utilizing a thermistor is provided in an image reading portion and an automatic adjustment in accordance with the same flow as that in FIG. 10 is executed when a certain temperature difference is generated with reference to a temperature at a starting time.

As is apparent from the description mentioned above, even when a plurality of line image sensors are arranged in the main scanning direction and the position of the respective overlapping portions are shifted in the sub scanning direction, it is possible to temporarily form the marker in the overlapping portion as the image and cancel the position shift with reference to the marker. Accordingly, it is unnecessary to correct the position shift by supplying the exclusive chart or the like, so that it is possible to widely reduce the load in the side of the user and it is possible to always keep a high quality image reading.

Further, since the image data of the read image in the overlapping portion between the line image sensors are processed in such a manner as to be followed between the line image sensors so as to prevent the image shift and the unclear image, it is possible to achieve a further high quality image reading.

Second Embodiment

In the first embodiment, the marker M formed by the LED 5 and the lens 6 is the point image, however, in the second embodiment, a description will be given of a structure characterized by a shape of the marker. FIG. 11 is a detailed view which shows a shape of the marker in accordance with the second embodiment.

Figure 11A:
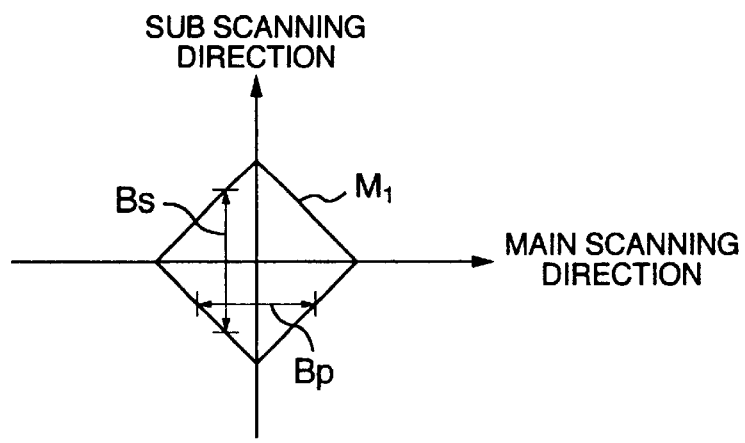
FIG. 11 is a detailed view which shows a shape of a marker in accordance with a second embodiment.

A marker M1 shown in FIG. 11A corresponds to an image formed in a regular rectangular shape by a light beam irradiated from the LED 5, and in the rectangular shape, two diagonal lines are coincided with the main scanning direction and the sub scanning direction. A width BP in the main scanning direction and a width BS in the sub scanning direction of the marker M1 are linearly changed so as to become wider as coming near to a center of the marker M1. That is, a changing point of the width BP in the main scanning direction and the width BS in the sub scanning direction exist in the center of the marker M1, and the width BP in the main scanning direction and the width BS in the sub scanning direction BS in the center of the marker M1 are widest. The position shift of the line image sensors 1 and 2 are corrected with reference to the center (the change point) of the marker M1.

Figure 12:
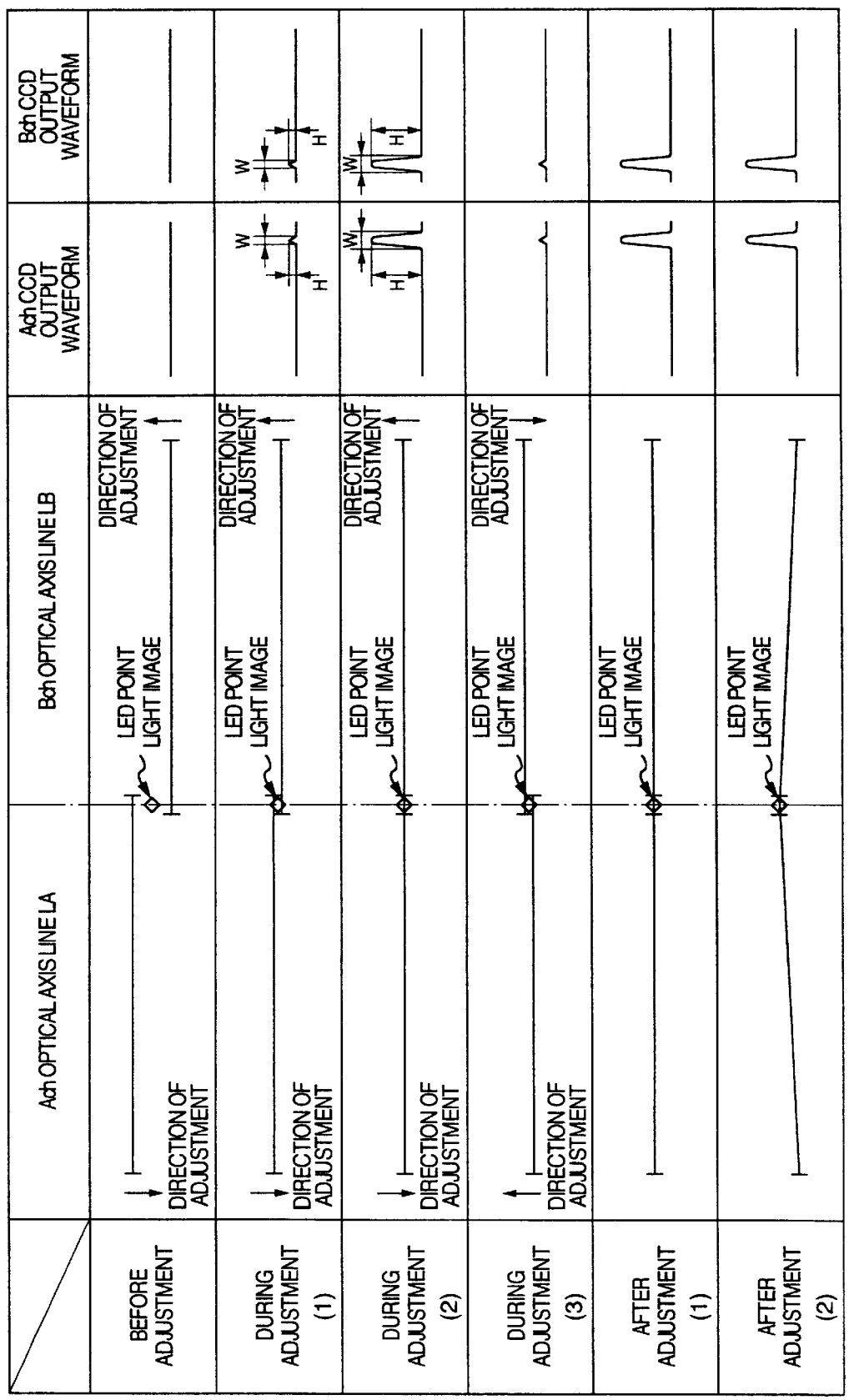
FIG. 12 is a view which shows a positioning way of the first and second line image sensors by utilizing the marker shown in FIG. 11A as a table.

FIG. 12 is a view which shows a positioning way for the image sensors 1 and 2 utilizing the marker M1 shown in FIG. 11A as a table.

In the case of correcting the position shift in the same manner as that of the embodiment shown in FIG. 3 with using the marker M1, when moving the line image sensors 1 and 2 in an adjusting direction, a peak width W is formed in an output waveform of the CCD in addition to the peak value H described in FIG. 4, as shown in FIG. 12. The peak width W becomes greater as moving near toward the center of the marker M1 as shown in the sections during adjustment (1) and (2), and when passing through the center of the marker M1, the peak width W is oppositely reduced as shown in the section during adjustment (3).

That is, if the change of the peak width W is detected in addition to the peak value H, it is known that the positions of the line image sensors 1 and 2 move toward the regular position when the detected peak value W is increased at a time of correcting the shift. On the contrary, when the peak width W becomes smaller, it is known that the line image sensors 1 and 2 move in a direction moving apart from the regular position. Accordingly, it is possible to correct the shift at a higher speed and a higher accuracy when always moving the line image sensors 1 and 2 in the direction that the peak width W is increased.

Figure 11B:
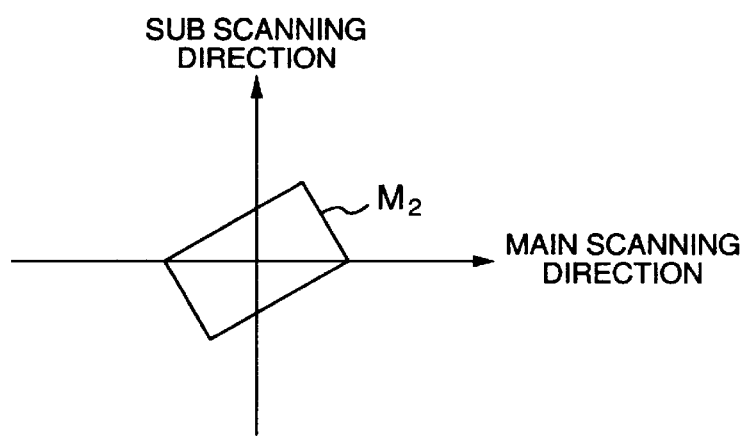

In this case, in addition to FIG. 11A, as the shape of the marker in which the width thereof is increased toward the center thereof, a round shape, a rectangular shape, a diamond shape and the like can be employed. As shown in FIG. 11B, in the case of a rectangular marker M2, the marker is arranged in such a manner that one of two diagonal lines in the rectangular shape coincides with the main scanning direction. In the case of a diamond marker (not shown), the marker is arranged in such a manner that two diagonal lines respectively coincide with the main scanning direction and the sub scanning direction. Since the waveform is increased as moving near to the regular position when correcting the shift of the line image sensors 1 and 2 with reference to the center of the marker, it is possible to detect the width of the peak at a simpler manner and at a higher accuracy. In particular, in the case that the width temporarily changes toward the center of the marker as the marker M1 shown in FIG. 11A, it is easy to expect the amount of shift from the regular position due to the change of the detected peak width, so that this is desirable.

Figure 11C:
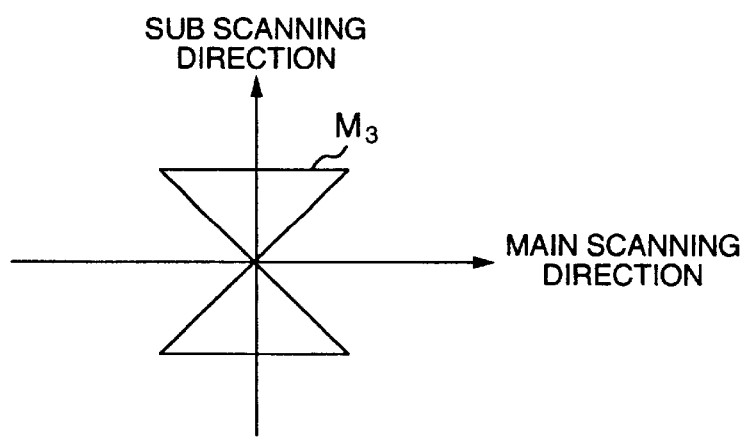

Further, a marker M3 shown in FIG. 11C is structured such that the width in the main scanning direction is changed so as to become narrow as being moved toward the center of the marker M3. In the case of correcting the shift with reference to the center of the marker M3, it is known that the positions of the line image sensors 1 and 2 move toward the regular positions when the detected peak width is reduced. On the contrary, when the peak width is increased, it is known that the positions move toward the direction moving apart from the regular positions. Accordingly, the shift correction can be performed at a higher speed and at a higher accuracy by always moving the line image sensors 1 and 2 in the direction that the peak width is reduced.

Further, in addition to the structure mentioned above, as the marker having a width being changed in the main scanning direction, the maker can be formed in a triangular shape or an X shape. In the case of the triangle marker, the marker is arranged in such a manner that one line coincides with the main scanning direction, and in the case of the X-shaped marker, the marker is arranged in such a manner that lines forming the X-shape are shifted at 45 degrees from the main scanning direction and the sub scanning direction. Also in this case, in the same manner as that mentioned above, the shift correction can be performed at a higher speed and at a higher accuracy by moving the line image sensors 1 and 2 in correspondence to the change of the detect peak width.

Third Embodiment

Figure 13:
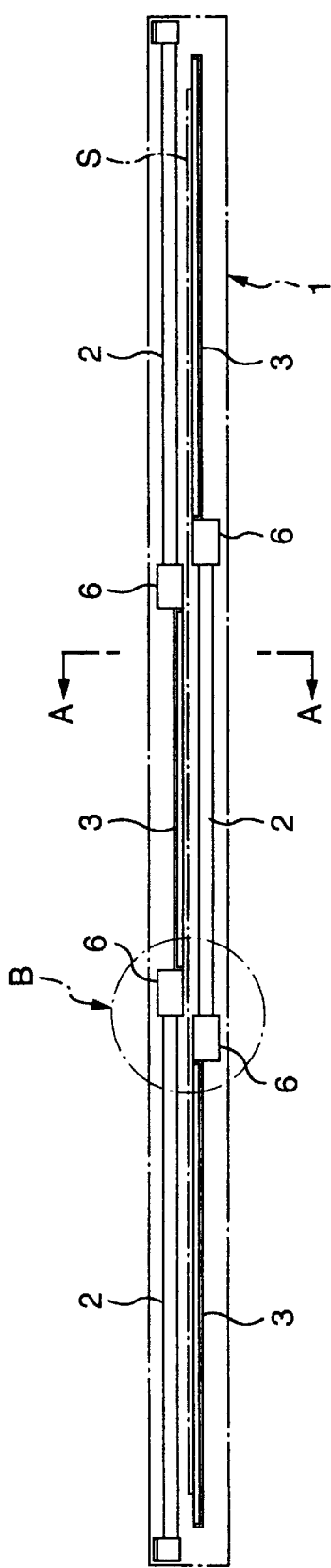
FIG. 13 is a schematic view of a reading optical system of an image reading apparatus in an embodiment in accordance with the present invention as seen from a target glass surface.
Figure 14:
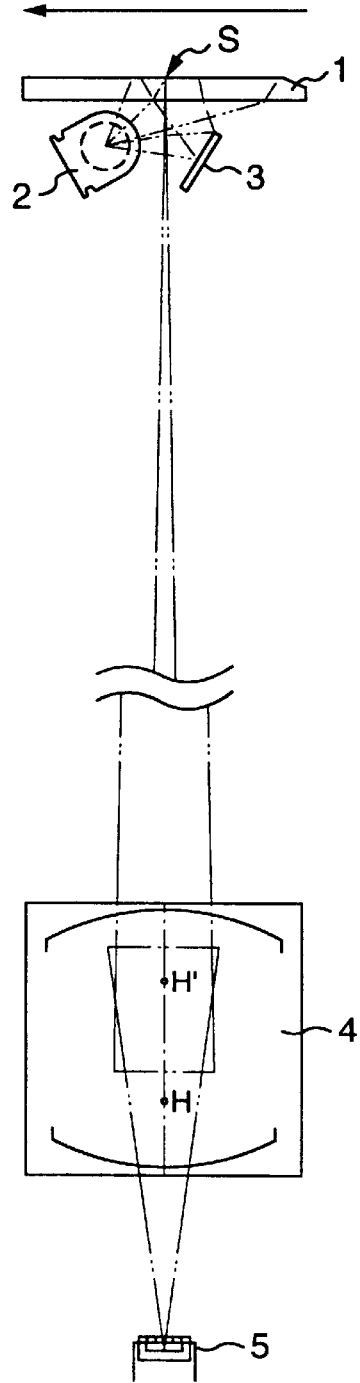
FIG. 14 is a cross sectional view along a line A—A in FIG. 1.
Figure 15A:
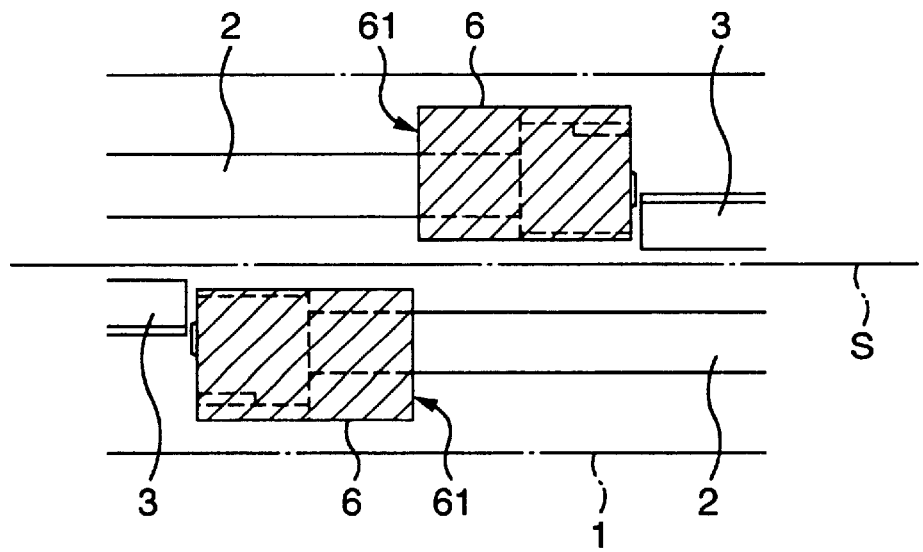
FIG. 15A is a detailed view of a B portion in FIG. 13 which shows a state of mounting a cap.
Figure 15B:
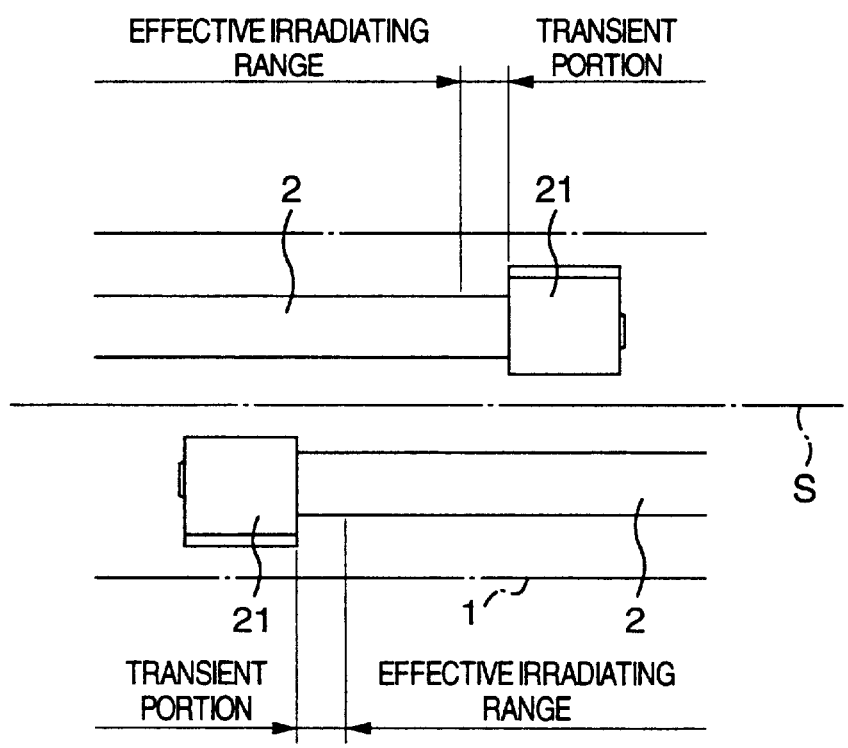
FIG. 15B is a detailed view of a B portion in FIG. 13 which shows a state of taking out the cap.
Figure 17:
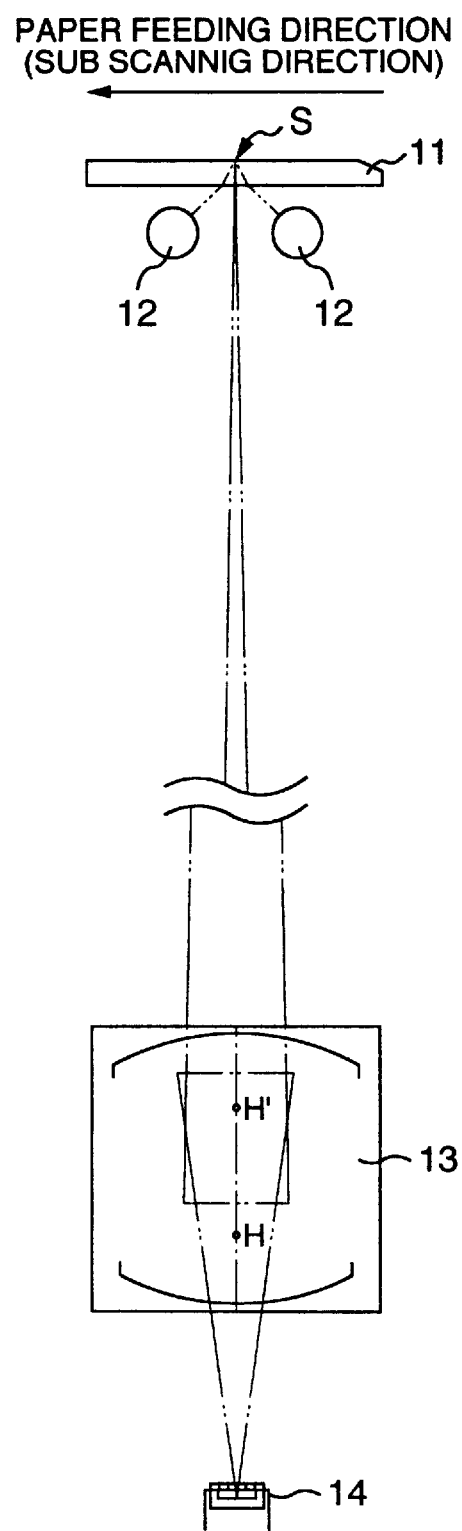
FIG. 17 is a schematic view of a reading optical system of a conventional image reading apparatus as seen in a main scanning direction.

FIG. 13 is a schematic view of a reading optical system of an image reading apparatus in accordance with the third embodiment of the present invention as seen from a target glass surface, FIG. 14 is a cross sectional view taken along a line A—A in FIG. 1, FIGS. 15A and 15B are view which shows details of a portion of B in FIG. 1, in which FIG. 15A shows a state that a cap is mounted and FIG. 15B shows a state that the cap is taken out, and FIG. 16 is a schematic view which shows a distribution of a light strength of a cold cathode tube.

As shown in FIGS. 13 and 14, an image reading apparatus in accordance with the embodiment of the present invention is provided with a target glass 1 provided in the paper supply passage for feeding the paper, cold cathode tubes 2 arranged in a zigzag manner with respect to a scanning axis S corresponding to an image reading position below the target glass 1 and serving as a light source, light source reflecting mirrors 3 arranged at positions opposing to the cold cathode tubes 2 with respect to the scanning axis S and serving as a light reflecting body, a lens 4 for forming the light beams irradiated on the image surface of the paper disposed on the target glass 1, and a CCD image sensor 5 reading the image formed by the lens 4 and serving as a line image sensor.

Sockets 21 for fixing the cold cathode tubes 2 to the apparatus and energizing the cold cathode tubes 2 are provided in both end portions of the cold cathode tubes 2 (refer to FIGS. 15B). A uniform amount of light can be obtained in an area which is about 5 mm inside a root portion of the socket 21 in the cold cathode tubes 2, and this area constitutes an effective irradiation range. An area being about 5 mm inside the root portion of the socket 21 constitutes a transient portion, and in this range, the amount of irradiated light is insufficient (refer to FIG. 16).

When arranging the cold cathode tubes 2 in a zigzag manner with respect to the scanning axis S, it is possible to overlap only a part of the socket 21 in the end portion of the cold cathode tube 2, however, in the third embodiment, the cold cathode tubes 2 are arranged in such a manner that the end portions of the cold cathode tubes 2 are overlapped with each other and the effective irradiation range of the respective cold cathode tubes 2 partly overlap with each other. This is because of mutually compensating an amount of light which is insufficient due to the socket 21 disposed at both end portions of the cold cathode tube 2 and having no light irradiation and the transient portion having an unstable amount of light. In this case, the cold cathode tube 2 may be structured in addition to the illustrated embodiment such that a plurality of cold cathode tubes are overlapped with each other so that the light can be substantially evenly irradiated to the scanning axis S.

Further, the end portion of the cold cathode tube 2 in accordance with the third embodiment is structured such that the socket 21, the transient portion and a part of the effective irradiating range are overlapped by the cap 6 corresponding to a light non-transmitting mask. Then, the positions of the end surfaces 61 of the cap 6 in the side of the effective irradiating range of the cold cathode tubes 2 arranged in a zigzag manner with respect to the scanning axis S are coincided with each other (refer to FIG. 15A). Since the cold cathode tubes 2 have dispersion in the width of the transient portion area in accordance with the products, the structure is made for the purpose of covering the transient portion having an unstable amount of irradiated light and employing only a stable portion so as to obtain a uniform amount of light (refer to FIG. 16).

That is, since only the effective irradiating ranges of the cold cathode tubes 2 are arranged in a line in the direction of the scanning axis S by covering the area between the socket 21 and a part of the area defined as the effective irradiating range on the specification of the product with the cap 6 which does not transmit the light beam, and arranging in a zigzag manner with coinciding the positions of the end surfaces 61, it is possible to irradiate the uniform amount of light to the image on the scanning axis S.

The light source reflecting mirror 3 is structured such as to reflect the light beam of the cold cathode tube 2 from the opposing position of the cold cathode tube 2 with respect to the scanning axis S and irradiate the light from both sides of the scanning axis S to the image on the paper by means of the light source reflecting mirror 3 and the cold cathode tube 2. It is possible to irradiate the light beam to the image directly described on the paper or printed from one side of the scanning axis S, however, in the case of irradiating the light beam to the image having unevenness on the paper such as the image formed by a photograph, a paper chip or the like attached to the paper from one side of the scanning axis S, a shadow is generated. In order to prevent the shadow from generating, the light beam is irradiated from both sides of the scanning axis S.

The light source reflecting mirror 3 mentioned above is arranged between the sockets 21 and 21 of the cold cathode tube 2 in the same line among the zigzag arranged cold cathode tubes 2. In this case, since the shadow is generated in the side of the socket 21 on the paper if the socket 21 is structured such as not to irradiate and reflect the light, the outer surface of the cap 6 covering the socket 21 is made white. Since the outer surface of the cap 6 reflects the light when setting the outer surface of the cap 6 opposing to the cold cathode tube 2 to be white, it is possible to reflect the light of the cold cathode tube 2 by means of the outer surface of the cap 6 together with the light source reflecting mirror 3.

In the structure mentioned above, since the light directly irradiated by the cold cathode tube 2 arranged in a zigzag manner with respect to the image on the paper passing over the target glass 1, and the light reflected by the light source reflecting mirror 3 and the cap having a light reflective performance are uniformly irradiated from both sides with holding the scanning axis S corresponding to the reading position therebetween, it is possible to scan and read the reflected light by the CCD image sensor 5 via the lens 4. That is, it is possible to irradiate the light in a wide range by arranging the cold cathode tubes 2 in a zigzag manner and it is possible to obtain a good image even in the case of the large-size paper.

In accordance with the present invention, the following effects can be obtained.
(1) It is possible to irradiate the light in a zigzag manner from both sides of the reading position to the image surface on the paper and it is possible to irradiate a sufficient amount of light onto the image surface even by employing the comparative compact light source. As a result, it is possible to apply the cold cathode tube or the like which is strong against a low temperature as a comparatively compact light source and having much quantity of light to the image reading apparatus employed for reading a large-size paper. That is, it is possible to irradiate a sufficient amount of light to the large-size paper and it is possible to perform a good image reading.

(2) Since the portion having a little quantity of light out of the effective irradiating range at the end portion in one of the light sources is compensated by being irradiated by another of the light sources, it is possible to apply a sufficient quantity of light to the image surface on the paper.

(3) Since the transient portion having an insufficient quantity of irradiated light at the end portion in the light source, it is possible to obtain a uniform quantity of light by using only the stable portion.

(4) Since it is possible to irradiate the light to the image surface on the paper from both sides comprising the light source and the position opposing to the light source with respect to the scanning axis by the light reflecting body at the position opposing to one of the light sources and the mask outer surface having a light reflective performance, it is possible to remove the influence with respect to the paper having unevenness.

What is claimed is:

1. A method of adjusting an image reading position structured such that a plurality of line image sensors having CCDs arranged as a photo-electric conversion element are arranged in a main scanning direction of a paper, and end portions in respective reading areas of said line image sensors adjacent to each other in an arrangement direction are overlapped with each other, thereby adjusting an image reading position of said line image sensor at a time of reading a whole image on said paper by a combination of said line image sensors, comprising the steps of:

irradiating light from light sources to an image surface on said paper so as to read reflected light thereof, said light sources arranged in a zigzag manner with overlapping end portions thereof with each other with respect to a reading position;

forming an image on an area included in the overlapping portion between a pair of adjacent line image sensors so as to form a marker;

respectively reading said marker by said pair of line image sensors;

inspecting a relative position of each of said pair of line image sensors with respect to said marker on the basis of each of output values of said pair of line image sensors at a time of reading said marker; and coinciding each of the overlapping portions of said pair of line image sensors with a sub scanning direction on the basis of the inspected result of said relative position.

2. A method of reading an image structured such that a plurality of line image sensors having CCDs arranged as a photo-electric conversion element are arranged in a main scanning direction of a paper, and end portions in respective reading areas of said line image sensors adjacent to each other In an arrangement direction are overlapped with each other, thereby reading a whole image on said paper by a combination of said line image sensors, comprising the steps of:

irradiating light from light sources to an image surface on said paper so as to read reflected light thereof, said light sources arranged in a zigzag manner with overlapping end portions thereof with each other with respect to a reading position; and gradually changing the image in the overlapping portion between said line image sensors adjacent in said main scanning direction from an image data main body of the image read by one of the line image sensors to an image data main body of the image read by another of the line image sensors, toward said main scanning direction.

3. An image reading apparatus structured such that a plurality of line image sensors having CCDs arranged as a photo-electric conversion element are arranged in a main scanning direction of a paper, and reading areas of said line image sensors adjacent to each other in an arrangement direction are overlapped with each other, comprising:

light sources that irradiate light to an image surface on said paper, said light sources arranged in a zigzag manner with overlapping end portions thereof with each other with respect to a reading position;

a moving section that independently moves each of said line image sensors in a sub scanning direction vertically crossing said main scanning direction;

an image former that forms an image on an area included in the overlapping portion between said line image sensors so as to form a marker;

an inspecting section that inspects a relative position of each of said pair of line image sensors with respect to said marker on the basis of each of output values of said pair of line image sensors at a time when maid line image sensors read said marker; and a driving section that drives in a direction of coinciding each of the overlapping portions of said pair of line image sensors with a sub scanning direction on the basis of the inspected result of said relative position.

4. The method of claim 1, wherein the end portions of said light sources are covered with a light non-transmitting mask.

5. The method of claim 2, wherein the end portions of said light sources are covered with a light non-transmitting mask.

6. The image reading apparatus of claim 3, wherein the end portions of said light sources are covered with a light non-transmitting mask.

* * * * *